(12) United States Patent
Goldstein (10) Patent No.: US 7,133,893 B2
(45) Date of Patent: Nov. 7, 2006

(54) OPPORTUNISTIC TRANSMISSION OF PORTABLY STORED DIGITAL DATA

(75) Inventor: Timothy L. Goldstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 09/921,467

(22) Filed: Aug. 3, 2001

(65) Prior Publication Data
US 2003/0028672 A1 Feb. 6, 2003

(51) Int. Cl.
G06F 15/16 (2006.01)
H04B 7/00 (2006.01)
H04B 1/38 (2006.01)

(52) U.S. Cl. .................. 709/203; 370/277; 455/73; 455/83; 455/11.1

(58) Field of Classification Search ................ 709/203; 370/277; 455/556, 11.1, 73, 83
See application file for complete search history.

(56) References Cited

U.S. PATENT DOCUMENTS

| 6,021,132 | A  | * | 2/2000  | Muller et al. ............... 370/412 |
| 6,058,399 | A  | * | 5/2000  | Morag et al. ............... 709/203 |
| 6,181,704 | B1 | * | 1/2001  | Drottar et al. .............. 370/410 |
| 6,324,178 | B1 | * | 11/2001 | Lo et al. ..................... 370/392 |
| 6,496,477 | B1 | * | 12/2002 | Perkins et al. .............. 370/228 |
| 6,567,983 | B1 | * | 5/2003  | Shiimori ...................... 709/203 |
| 6,784,925 | B1 | * | 8/2004  | Tomat et al. .......... 348/207.11 |
| 6,798,533 | B1 | * | 9/2004  | Tipirneni ..................... 709/229 |
| 6,891,567 | B1 | * | 5/2005  | Steinberg ............... 348/211.99 |
| 6,967,675 | B1 | * | 11/2005 | Ito et al. .................. 348/207.1 |
| 2001/0002365 | A1 | * | 5/2001 | Minakuchi et al. ......... 455/556 |
| 2001/0005371 | A1 |   | 6/2001 | Sera |
| 2002/0032027 | A1 | * | 3/2002 | Kirani et al. ................ 455/426 |
| 2002/0065058 | A1 | * | 5/2002 | Gatherer et al. ............ 455/272 |
| 2002/0065872 | A1 | * | 5/2002 | Genske et al. .............. 709/202 |
| 2002/0129170 | A1 | * | 9/2002 | Moore et al. ............... 709/201 |
| 2002/0146980 | A1 | * | 10/2002 | Solondz et al. ................ 455/21 |
| 2003/0036974 | A1 | * | 2/2003 | Allen .......................... 705/27 |

FOREIGN PATENT DOCUMENTS

| GB | 2 393 007 | 3/2004 |
| WO | WO 00/13455 | 3/2000 |
| WO | WO2003/003141 | 1/2003 |

OTHER PUBLICATIONS

Miller, Brent. Bluetooth Revealed, published Sep. 21, 2000, Prentice Hall.*
Kieffer, R., Image Thumbnailing Whitepaper, Jul. 19, 1998, Alodar Systems Inc. Published.*
Specification of the Bluetooth System,Version 1.1, Feb. 22, 2001, Bluetooth Sig., Inc., vol. 1.*
Foreign Search Report dated Jan. 13, 2003.

* cited by examiner

Primary Examiner—John Follansbee
Assistant Examiner—Ashok Patel (57) ABSTRACT

The present invention discloses a system and method to provide memory management for electronic devices having limited and/or finite memory resources. The preferred inventive device packetizes the original digital data stored on the device. A communication controller opportunistically establishes communications between the electronic device and at least one remote transport device. A transceiver singly transmits copies of the packets to the remote device. The transceiver also operates to receive the communication signals from the remote devices. As the copies of the packets are transmitted, a memory controller deletes the digital data corresponding to the transmitted packets, thus freeing space on the electronic device memory.

27 Claims, 5 Drawing Sheets

OPPORTUNISTIC TRANSMISSION OF PORTABLY STORED DIGITAL DATA

TECHNICAL FIELD

The present invention relates generally to consumer electronic devices and, more particularly, to a system and method for managing memory resources on such electronic devices.

BACKGROUND

Portable electronic devices are increasing in numbers and availability at a staggering pace. Personal digital assistants (PDAs), digital recorders, digital cameras, special watches, and the like each provide a high level of convenience to users without the limitations and imperfections sometimes found with older technology recording media, such as analog tapes and film. One problem encountered as the use of such devices increases is the limited digital storage space. For example, in digital cameras, the number of photographs available typically depends on the amount of memory available for the camera. While a user may be able to take 20 or 30 pictures using a low quality resolution, if the user desires a higher quality photo, they may only be able to take three or four pictures before using up the memory. The user would then typically have to transfer the photos to a larger memory, such as on a hard disk or other similar device, and erase the camera's memory before taking more pictures. Similar situations may typically be experienced with digital recorders, PDAs, and the like.

One solution to this problem is for the user to purchase additional memory or a memory with a larger capacity. While this solution generally provides a temporary solution (i.e., the larger memory is still finite and, thus, generally limited to a finite number of pictures, or minutes of record time without erasing its content), it is expensive to buy multiple storage media and/or media with large volumes of space.

A second solution is to routinely empty the storage media into a larger memory resource, such as a hard disk, CD-ROM, printer memory, or the like. Many current electronic devices generally require the user to remove the storage media from the device and then insert the media into a drive suitable for the storage media. Some devices, such as the Sony Mavica (TM) line of digital cameras may use typically standard 3.5 inch floppy diskettes that generally make transporting the stored images onto a larger computer memory more convenient. However, many other devices use media such as Compact Flash (CF) cards, PC cards, SmartMedia (TM), multimedia cards, or proprietary storage media such as Sony's Memory Stick (TM), each tend to require special drives for transporting the media content to a typical desktop, laptop, and/or notebook computer system. Such specialty media drives also add costs to the user. These "non-standard" media make emptying the storage media more inconvenient.

Some portable electronic devices may also be connected directly to another computer system to download the memory's file contents. Some such devices will also generally have removable memory media as described above. However, some may only provide for non-removable, built-in memory, such as with random access memory (RAM), Flash read-only memory (ROM), or the like. The direct connection option generally allows for device memory to be transferred without the necessity of purchasing specialized memory drives. However, the downloading process typically drains the energy resource of the device (e.g., disposable or rechargeable batteries) more quickly, thus reducing the effective length of operation for the device. Downloading from the device also typically is much slower than downloading a removable memory in a memory drive. Therefore, the direct connection method not only typically drains the resources of the device, it generally takes longer to transfer the information as well.

While many current portable electronic devices allow for memory management through removable memory and direct-link connection to a target computer system, in many instances, a user may not have access to an external memory or computer system in order to transfer the stored device data. For example, if a user is conducting an interview using a digital recorder, the user may not have access to a larger memory or computer system during the interview. If the interview lasts longer than expected, the user would generally be forced either to stop the interview, stop recording the interview, or record over portions of the memory. None of these may be practical solutions.

SUMMARY OF THE INVENTION

The present invention is directed to a system and method that provides memory management for electronic devices having limited and/or finite memory resources. The preferred embodiment of the present invention includes an electronic device having digital data stored thereon, the electronic device comprising a packetizer for manipulating the digital data into a plurality of packets, a communication controller for opportunistically establishing communication between the electronic device and at least one remote transport device, and a transceiver for singly transmitting copies of the packets to the at least one remote transport device and receiving communication signals from ones of the at least one remote transport devices.

DETAILED DESCRIPTION

Figure 1A:
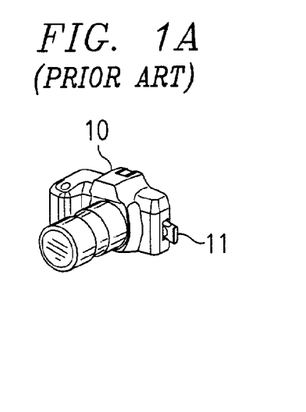
FIG. 1A is a perspective view of a prior art portable electronic device.
Figure 1B:
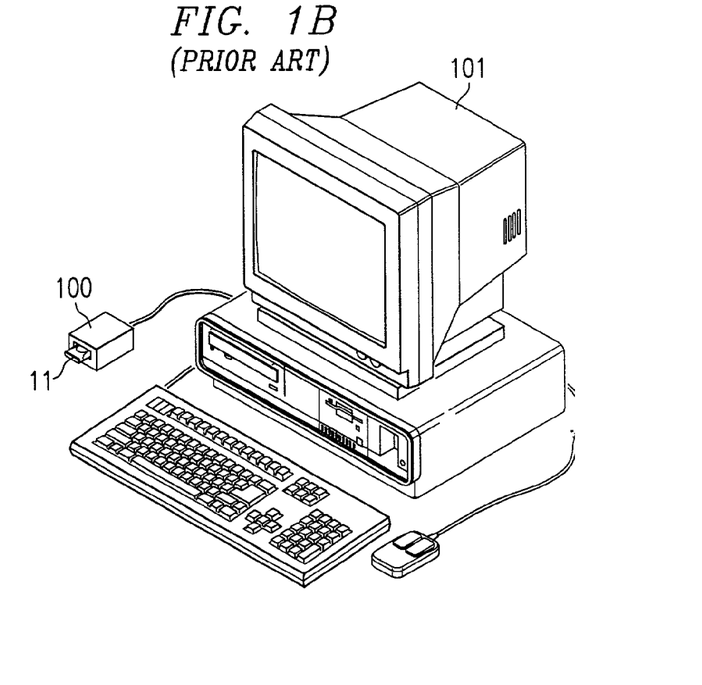
FIG. 1B is a perspective view of a prior art system for transferring data to a computer system from a removable storage media.
Figure 1C:
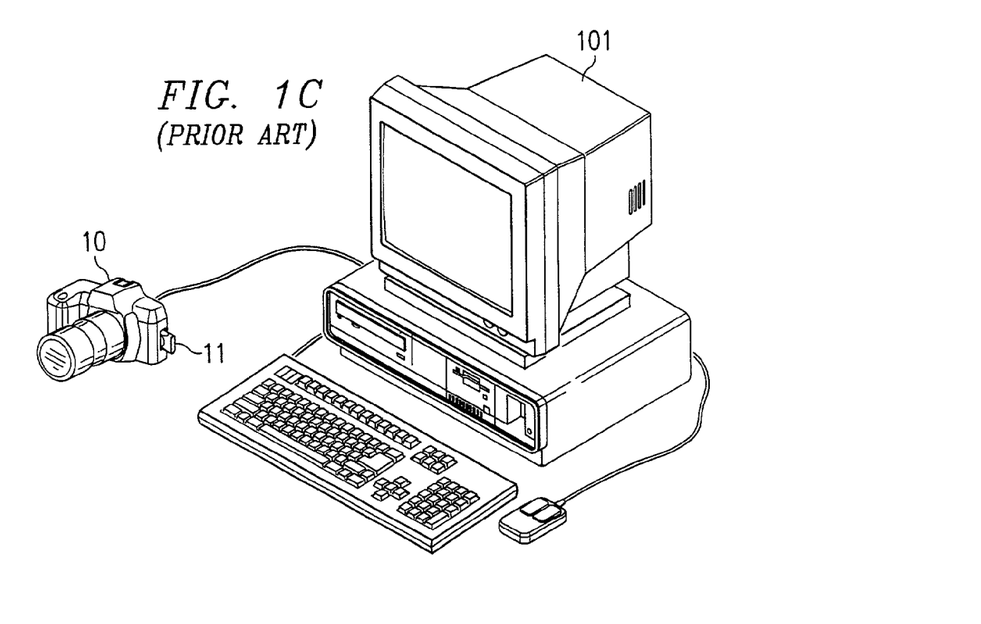
FIG. 1C is a perspective view of another prior art system for transferring data from a portable electronic device directly to a computer system.

FIGS. 1A–1C illustrate the prior art systems used for managing the memory resources of a typical portable electronic device. In FIG. 1A, digital camera 10 comprises the camera-works and storage media 11 for storing the digital data representative of the captured photographs. Although storage media 11 is shown protruding from digital camera 10, in many such devices, the removable storage media is inserted into the device and is not externally visible. The visibility of storage media 11 is presented herein for illustrative purposes only.

Two general methods exist for transferring the captured data from storage media 11 to another useable medium. FIG. 1B shows storage media 11 inserted into drive 100 connected to computer system 101. Through its connection with computer system 101, the contents of storage media 11 are transmitted through the reader head(s) within drive 100. Alternatively, digital camera 10 may be directly connected to computer system 101, as shown in FIG. 1C. Here the contents of storage media 11 are read through digital camera 10 and transferred to computer system 101 directly.

As previously mentioned, the existing means for managing storage media 11 require the user to physically connect to an external source, i.e., computer system 101, in order to refresh storage media 11 to the point at which more pictures may be taken from digital camera 10. These systems are relatively inconvenient, through their necessity for connecting to computer system 101, or costly, through the necessity to purchase additional drives, such as drive 100, or larger-capacity storage media (not specifically shown).

Figure 2A:
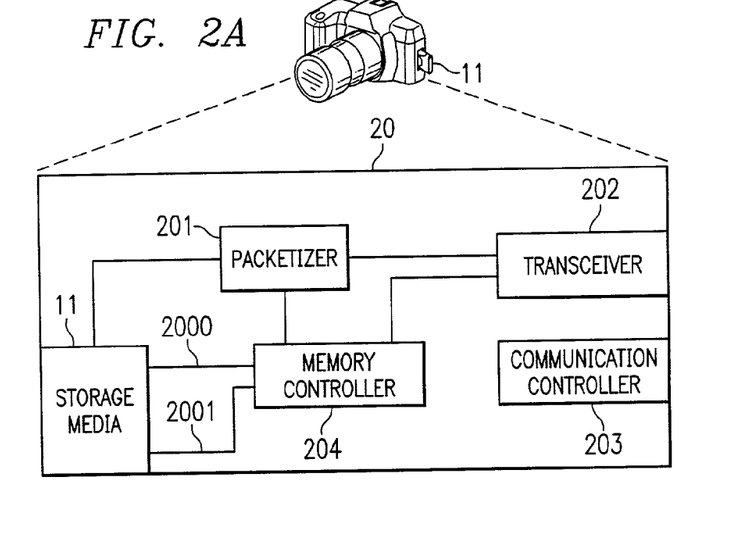
FIG. 2A is a perspective view with a block diagram illustrating a portable electronic device memory management system configured according to the present invention.
Figure 2B:
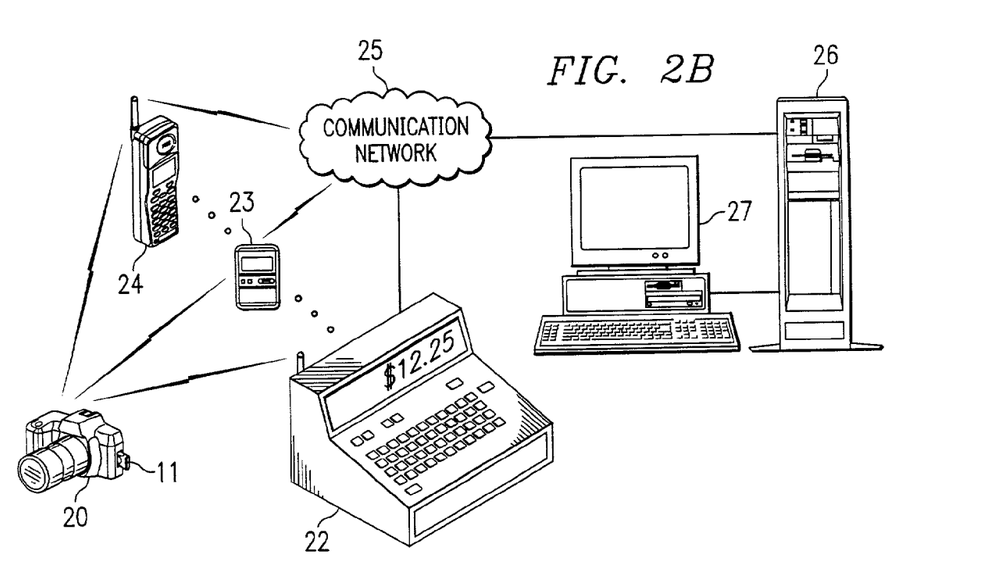
FIG. 2B is a perspective view illustrating a portable electronic device memory management system configured according to the present invention.

FIG. 2A illustrates a preferred embodiment of the present invention that provides an efficient system for managing the limited memory resources of a typical electronic device. Digital camera 20 is configured according to the present invention. It uses similar memory, such as storage media 11, that allows it to be compatible with the prior art methods of memory management depicted in FIGS. 1A–1C. However, digital camera 20 includes additional preferred elements as shown in FIGS. 2A and 2B.

Digital camera 20 preferably comprises packetizer 201 that manipulates and processes the data stored in storage media 11 into a collection and sequence of packets. Depending on the system contemplated for use, the packets may generally be comprised of varying size. In some systems, each packet may have a uniform data/payload length along with the appropriate destination, origination, and sequence information in header information blocks within the packets. Alternatively, some systems may allow for variable-sized packets that may vary the size of the data/payload as well as the header information.

Digital camera 20 also preferably includes transceiver 202 and communication controller 203 to facilitate opportunistic communication with remote transport hosts. Communication controller 203 preferably broadcasts a general hail into a range around digital camera 20. While not necessarily a part of a specific system or network, communication controller 203, through transceiver 202, opportunistically monitors any reply communication signals that may be sent by neighboring devices that receive and recognize the hail. As an opportunity arises with the detection of a reply signal, a communication link between digital camera 20 and the responding device is preferably established.

Transceiver 202 preferably transmits copies of each of the packets to the remote transport devices that have established a communication link with digital camera 20. In the preferred embodiment, a single packet is preferably opportunistically transmitted to a single remote transport device. The other packets are preferably also singly transmitted to additional single remote devices. As the packets are transmitted from digital camera 20, transceiver 202 and packetizer 201 preferably signal to memory controller 204 that a particular packet has been transmitted. Once a packet has been transmitted, memory controller 204 may preferably delete the particular data corresponding to the transmitted packets.

It should be noted that in alternative embodiments, memory controller 204 preferably may process the data into miniaturized or reduced representations of the original image, such as with a thumbnail image of the original. In such alternative embodiments, memory controller 204 may save the data corresponding to the thumbnail through path 2001, while deleting the data on the original image through path 2000.

FIG. 2B shows a perspective view representative of a typical connection map of the present invention. By way of example of a preferred embodiment of the present invention, a user has taken pictures with digital camera 20 that are now stored on storage media 11. As the user walks along, digital camera 20 emits a general hail within a certain radius. Cash register 22 preferably incorporates wireless technology compatible with the format transmitted from digital camera 20. When the user passes by cash register 22, cash register 22 preferably sends a response to the hail. Digital camera 20 receives the response and preferably sets up an opportunistic communication link with cash register 22. Once the communication link is established, digital camera 20 preferably sends a single packet to cash register 22. The packet is sent addressed to a centralized collection point. Using its operating system and network capabilities, cash register 22 reads the destination address of the packet and sends it to collection host 26 over communication network 25, which could be the Internet or some other data network.

Digital camera 20 preferably monitors the packets that are transmitted and once the transmission has been detected, the data on storage media 11 that corresponds to the transmitted packet may preferably be erased. This process slowly erases the data on storage media 11, advantageously making room for new pictures, data and/or, information to be recorded thereon.

Concurrently with the communication session transpiring between digital camera 20 and cash register 22, digital camera 20 preferably continues to issue its general hail during communication transmission pauses. As the user passes near two-way pager 23 and mobile phone 24, both of which preferably incorporate compatible wireless technology, pager 23 and phone 24 preferably transmit response signals to digital camera 20. Digital camera 20 then preferably establishes other opportunistic communication links between each of two-way pager 23 and mobile phone 24. Once such links are established, digital camera 20 transmits single packets to each of two-way pager 23 and mobile phone 24. In continuance of the preferred embodiment, digital camera may maintain a communication link with any of cash register 22, two-way pager 23, and/or mobile phone 24 for as long as the devices are within range. As long as the communication link remains active, digital camera 20 may send another single packet to any or all of the devices on the link(s).

The preferred embodiment of the present invention uses singly transmitted packets in order to minimize the possibility that a wireless personal device, such as two-way pager 23 or mobile phone 24 is charged for any air time used when transmitting the packet through communication network 24 to collection host 26. To further this goal, the transmitted packets may preferably be configured to be transmitted during routine connection times between the wireless devices, when the wireless service providers typically do not charge for connection air time. Alternatively, the transmitted packets could also be configured to piggy-back onto a packet of data transmitted by the wireless device during normal use.

It should be noted that other means may be used to prevent costs charged to carriers or intermediate hosts. For example, mobile telecommunications use control channels to transmit codes and signals for setting up calls or other types of call administration functions. A preferred embodiment of the present invention may also use the control channels of the mobile communication network to transmit its data.

As the user passes within range of any number of different compatible devices, packets are preferably transmitted out with the corresponding data on storage media 11 slowly being deleted or erased, thus dynamically making room for new information to be recorded. In alternative embodiments configured to save thumbnails of the original image, the user may still preferably view a catalog of the pictures taken, even though the full original image has preferably been transmitted to collection host 26 and deleted from storage media 11.

Ideally, during the user's travels, each of the pictures taken from digital camera 20 is preferably transmitted and forwarded, packet-by-packet, to collection host 26. Collection host 26 preferably receives all of the transmitted packets that have been forwarded by the intermediate transport devices, such as cash register 22 and mobile phone 24, and reassembles them into the coherent data of the original photographed images. The user may then preferably access the transmitted pictures by communicating with collection host 26 through a device such as general purpose computer 27.

It should be noted that various means may be used to access the transmitted pictures on collection host 26. The user may access through the Internet or may access collection host 26 through a direct dial-up connection as shown in FIG. 2B. Once accessed, the user may view the pictures on collection host 26, process and/or manipulate the pictures on collection host 26, or download the pictures to general purpose computer 27 to process or manipulate the pictures in some manner.

Figure 3:
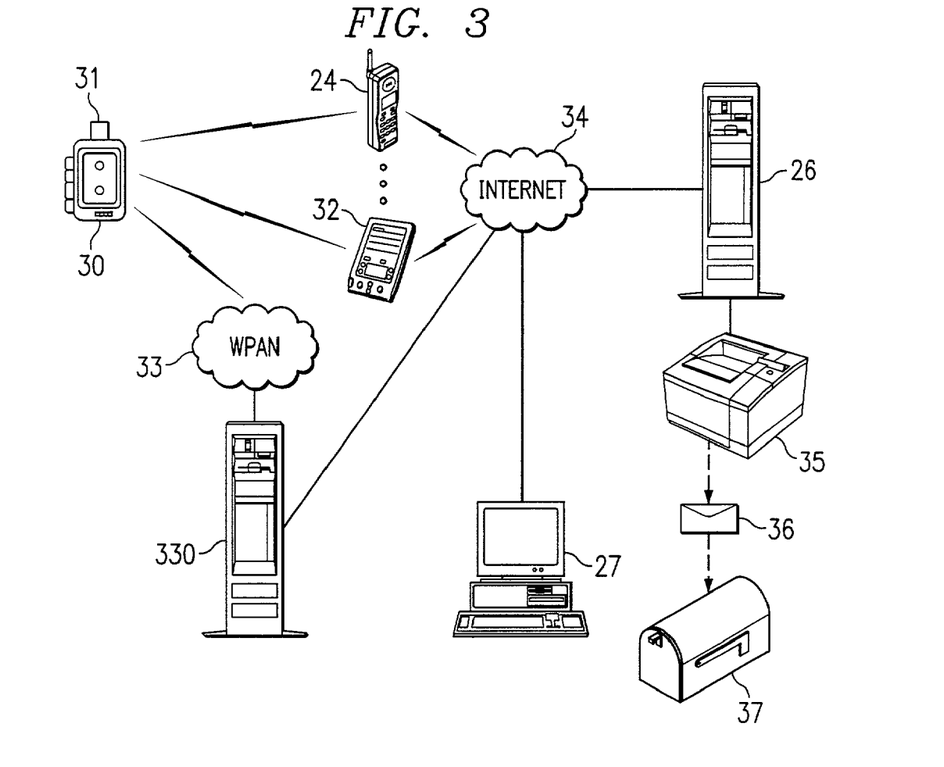
FIG. 3 is a perspective view of illustrating another portable electronic device in a memory management system configured according to the present invention.

FIG. 3 shows an alternative embodiment of the present invention illustrated with digital recorder 30. Digital recorder 30 includes removable memory 31 for storing the audio recordings. Through the similar hail-response-transmit sequence, packets of the audio data are transmitted and forwarded over Internet 34 to collection host 26 through compatible transport devices such as mobile phone 24, personal digital assistant (PDA) 32, wireless personal area network (WPAN) master server 330, and the like. The user may then use general purpose computer 27 to access collection host 26 over Internet 34. In the embodiment shown in FIG. 3, the user may direct collection host 26 to print a transcript of the audio data on printer 35 and send the transcription in letter 36 to a destination address such as mailbox 37.

The preferred embodiments of the present invention described to this point have transmitted single packets or, at least, single copies of packets through the various different devices. As packets are transmitted from the electronic device to any number of intermediate transport devices and across various networks, opportunity exists for a packet to become lost or dropped. Because the packet size is typically small, the loss of a few packets may not have a seriously adverse effect on the reassembled data. However, if too many packets become lost in an original, such as a picture, the resulting picture may experience a degradation in quality. One alternative preferred embodiment would preferably increase the probability of every packet arriving at the destination collection point by transmitting multiple copies of the same packet to different ones of the compatible transport devices.

It should be noted that alternative embodiments of the present invention may also incorporate other means of error checking to prevent undesirable loss of some of the transmitted data packets. One such method available for use would be cyclical redundancy checking (CRC). CRC is an error checking technique used to verify the accuracy of transmitting digital data. The transmitted messages are divided into predetermined length which, used as dividends, are divided by a fixed divisor. The remainder of the calculation is generally appended onto and sent with the data message. At the receiving end, the receiving host recalculates the remainder. If it does not match the transmitted remainder, an error is detected.

In still further embodiments, portions of data from one packet may be included in the subsequent packet. Therefore, if packets are lost, the lost packets may, to a certain extent, be rebuilt based on the redundant information in the surviving packets. It should be noted that any such error checking or error correction methods may be used by the present invention. It is not limited to the methods solely described herein.

Figure 4:
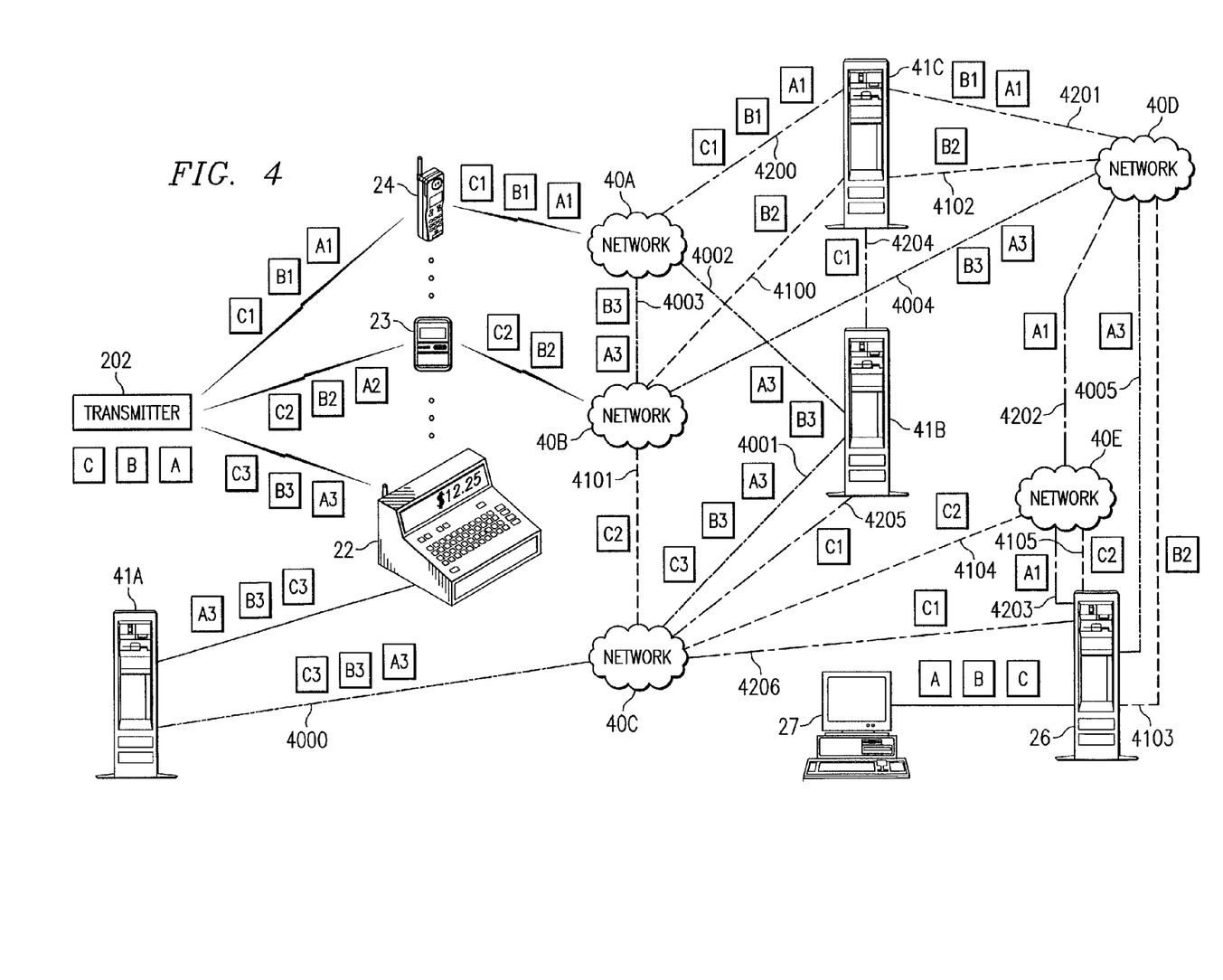
FIG. 4 is a perspective view illustrating packet transmission paths of a typical portable electronic device memory management system configured according to the present invention.

FIG. 4 illustrates a transmission path network utilizing the preferred embodiment for transmitting multiple copies of the same packet. The original data, which may be a picture from digital camera 20 (FIGS. 2A & 2B), or an audio recording from digital recorder 30 (FIG. 3), has been processed into at least packets A, B, and C. During the transmission sequences, transmitter 202 preferably transmits three copies of each packet to intermediate transport devices, such as cash register 22, two-way pager 23, mobile phone 24, and the like. Copies A1, B1, C1 are shown preferably transmitted to mobile phone 24, while copies A2, B2, C2 are preferably transmitted to pager 23, and copies A3, B3, C3 are preferably transmitted to cash register 22.

From mobile phone 24, packets A1, B1, C1 are transmitted to network 40A, which may be the wireless network providing telecommunications services to mobile phone 24. Packets A1, B1, C1 are then sent from network 40A to server 41C over path 4200. From server 41C, packets A1, B1 are sent over path 4201 to network 40D. However, path 4201 malfunctions before packet C1 has been transmitted from server 41C. Server 41C finds an alternate route for C1 and transmits C1 to server 41B over path 4204. Within network 40D, packet A1 gets dropped by a congested network element (not shown). However, packet B1 is successfully sent from network 40D to collection host 26 over path 4103.

Server 41B sends packet C1 to network 40C over path 4205. From network 40C, packet C1 is successfully transmitted to collection host 26 over path 4206. Therefore, from the three packets transmitted to mobile phone 24, only two, B1 and C1, actually arrive at collection host 26.

Returning to two-way pager 23, packets A2, B2, C2 are transmitted to network 40B. However, due to a deficiency of signal strength (not shown), packet A2 is lost in the transmission. Therefore, only packets B2, C2 arrive at network 40B. Within network 40B, packet B2 is lost as some network element (not shown) malfunctions. Packet C2 is re-routed to network 40C over path 4101. From network 40C, packet C2 is transmitted over path 4104 to network 40E. Packet C2 is then successfully transmitted to collection host 26 over path 4105. Here, of the three packets initially transmitted from transmitter 202, only one, C2, successfully arrives at collection host 26.

Packets A3, B3, C3 are sent from cash register 22 to server 41A. From server 41A, packets A3, B3, C3 are each sent over path 4000 to network 40C. A3, B3, C3 are then sent from network 40C to server 41B over path 4001. Server 41B malfunctions, thereby deleting packet C3 after packets A3, B3 were successfully transmitted over path 4002 to network 40A. From network 40A, packets A3, B3 are sent to network 40B over path 4003. From there, packets A3, B3 are transmitted over path 4004 to network 40D. Within network 40D, another network element (not shown) drops packet B3 because of excess network congestion. Network 40D re-routes packet A3 to collection host 26 directly over path 4005. Here again, of the three packets originally transmitted to cash register 22, only one, A3, successfully arrives at collection host 26.

Thus, from the process of transmitting multiple copies of a single packet over the ultimate network path, collection host 26 preferably receives packets A1, A3, B2, C1, and C2. From these multiple packets, collection host 26 is able to reassemble the entire original picture of packets A, B, C. The originally transmitted packets are then transmitted to the user through general purpose computer 27.

The alternative multiple copy transmission embodiment shown in FIG. 4 illustrates that if only a single copy would have been transmitted in any of the scenarios described, collection host 26 may not have received a complete representation of the originally transmitted data. This illustrated alternative embodiment therefore, provides an improved reliability of the present invention. Such an embodiment could be implemented for a system in which the security of the packets and/or data is more sensitive.

Figure 5:
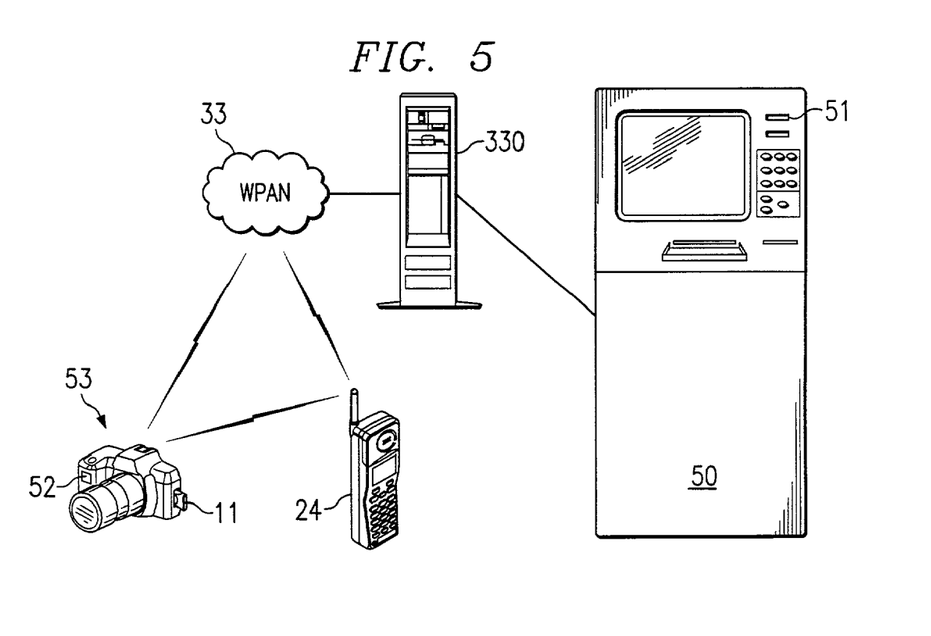
FIG. 5 is a perspective view illustrating an alternative embodiment of the present inventive memory management system.

FIG. 5 shows an alternative embodiment of the present invention configured to provide the memory management system within a single network or collection of associated networks. A user with digital camera 53 having pictures stored on storage media 11 preferably enters a store with a WPAN, such as Bluetooth, IEEE 802.11, HomeRF, infrared (IR), or the like. The store includes a photo processing center equipped to read digital images and process the images into standard prints. As the user enters the store and begins shopping, digital camera 53 preferably begins communicating through the WPAN network to store's master server 330, transmitting the packets representative of the digital images stored on storage media 11. Master server 330 preferably sends each received packet to photo processor 50 for reassembly. The downloading process may preferably be enhanced by digital camera 53 establishing additional communication links with other intermediate transport devices, such as mobile phone 24 carried by another shopper. The multiple communication sessions preferably increase the speed at which digital camera 20 is able to transmit the packets of data.

When the user finishes shopping he or she may go to photo processor 50 to pick up any prints that may have been produced. If the user did not spend enough time to fully download the pictures from digital camera 53, an alternative embodiment of the present invention would allow the user to preferably stop the opportunistic downloading and/or transmission of the image data on storage media 11 by actuating switch 52 on digital camera. It should be noted that while FIG. 5 illustrates switch 52 for manually deactivating the opportunistic transmission, the present invention is not so limited. An alternative embodiment may include a hidden switch that is preferably automatically activated when the user opens a door to remove the memory. An alternative switch may be provided that is preferably activated when the user actually removes the memory. Any number of different methods could be used to implement such a deactivation of the inventive opportunistic transmission process.

Once the process has been deactivated, the user may then preferably remove storage media 11 and insert it into drive slot 51 from which photo processor 50 would preferably directly read the image data. Photo processor 50 would then preferably complete assembling the image data and print the photos for the user.

Figure 6:
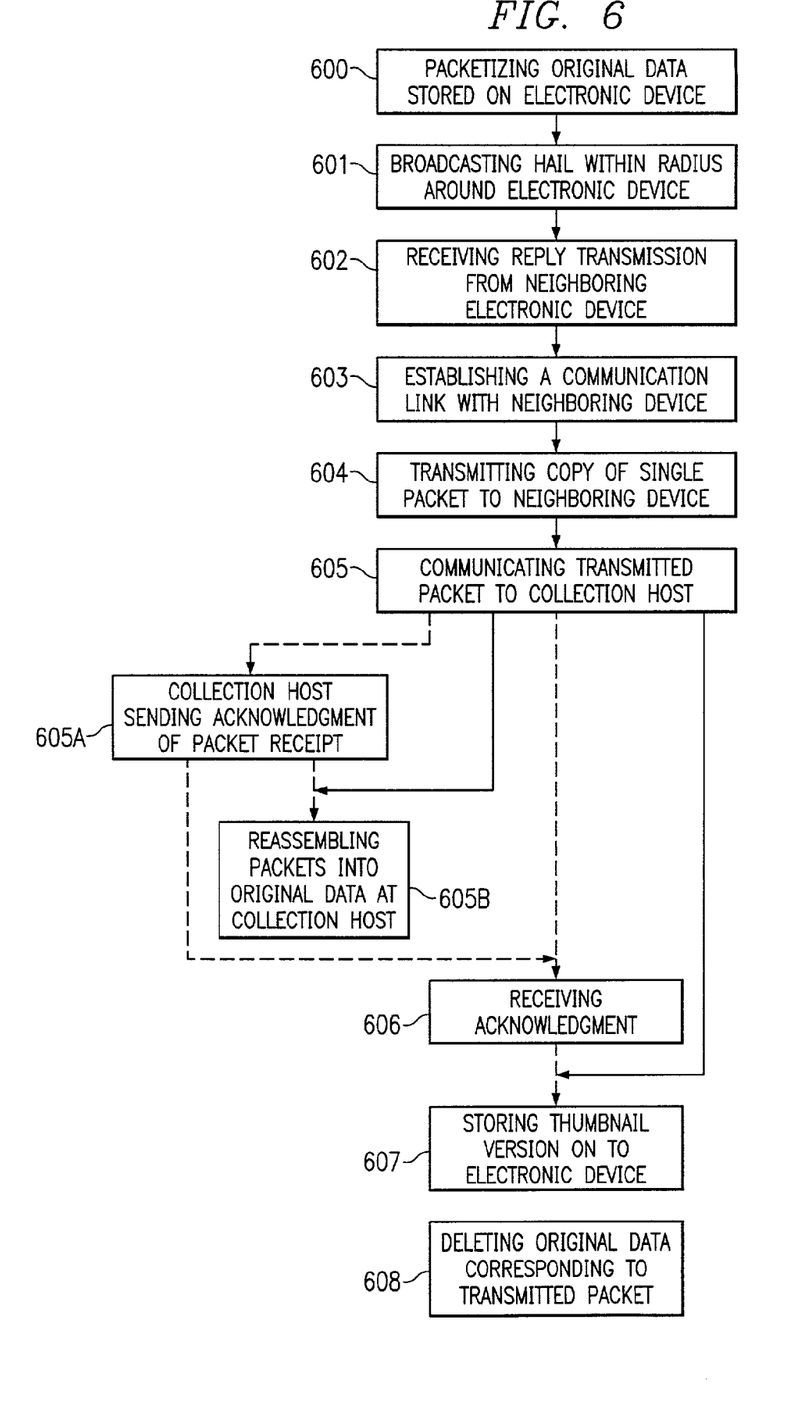
FIG. 6 is a flow chart illustrating the steps of operation for a preferred embodiment of the present invention.

FIG. 6 is a flowchart illustrating the steps performed in execution of a preferred embodiment of the present invention. In step 600, the original data stored on an electronic device is preferably packetized. The electronic device preferably broadcasts a general hail within a radius around the device in step 601. Any compatible neighboring transport devices may preferably transmit a reply that is received by the electronic device in step 602. A communication link is preferably thereafter opportunistically established with the neighboring device in step 603. In step 604, the electronic device preferably transmits a copy of a single packet to the neighboring device. Upon receipt of the packet, the neighboring device preferably sends the packet along to a collection host in step 605. After the packet has been transmitted, the electronic device may preferably store a thumbnail version of the original data in step 607, after which the data corresponding to the transmitted packet is preferably deleted from the original data in step 608. The transmitted packets will be reassembled into the original form at the collection host in step 605B. The user may then access the reassembled data by accessing the collection host.

In an alternative version of the present invention, the collection host preferably sends an acknowledgment of the received packet addressed to the electronic device in step 605A. The acknowledgment is received by the electronic device in step 606 prior to steps 607 and 608. Using the acknowledgment process, errors in packet transmission may preferably be detected and thus may prevent the device from deleting the original copy of the transmitted data. If the acknowledgment is not received in step 606, the steps of the invention do not proceed for that packet.

It should be noted that in some alternative embodiments, it may not be possible or practicable to incorporate the acknowledgment feature. Because the present invention works in a mobile environment, the original electronic device may exit the range of the particular transport device. Therefore, any acknowledgments sent back through the transmission path may not successfully reach the original device. Furthermore, some embodiments may employ intermediate or interim servers which strip any device information from the data being transmitted through the inventive system. In such embodiments, there would be no return address to access or target the original electronic device.

It should be noted that in alternative embodiments of the present invention, the user may preferably designate specific files or information to be opportunistically transmitted, or conversely, may designate files not to be transmitted. Alternative embodiments may also preferably allow the user to select options to prevent the inventive system from deleting certain ones or all of the information residing on the device memory.

It should further be noted that the present invention may be configured into a single, related network or system. For example, an establishment, such as a zoo or amusement park, may offer patrons rental of portable electronic devices within the establishment. Thus, if a family rents a camera for the day at a zoo, any pictures that may be taken could be transmitted to a processing center that allows the family to pick up or view the pictures taken during the day. These processing centers could allow the family to purchase prints of any selected pictures or also allow the family to purchase digital copies to be e-mailed to their own addresses or to the addresses of friends and families. In such an embodiment, the establishment would preferably assemble a related group of electronic devices and transport devices throughout the establishment with a centralized related collection host or network of collection hosts.

In additional alternative embodiments, users could purchase a service that activates the transceiver within the particular device and also activates a user-related file location at the collection host. Therefore, after the user signs up for the service, his or her device is activated and will send all packets addressed to the service's collection host.

What is claimed is:

1. An electronic device having digital data stored thereon, said electronic device comprising:
    a packetizer for manipulating said digital data into a plurality of packets;
    a communication controller for opportunistically establishing communication between said electronic device and at least one remote transport device; and
    a transceiver for singly transmitting copies of said packets to said at least one remote transport device and receiving communication signals from ones of said at least one remote transport devices to gradually erase said digital data stored on the electronic device to manage memory resources for the electronic device and automatically make room for more digital data to be stored on the electronic device without the user having to manually offload the digital date.

2. The electronic device of claim 1 further comprising:
    a memory controller for singly deleting said digital data that corresponds to said transmitted copies of said packets.

3. The electronic device of claim 1 further comprising:
    an interactive memory controller wherein a user selects ones of said digital data corresponding to said transmitted copies of said pockets for deletion.

4. The electronic device of claim 1 wherein said at least one remote transport device comprises:
    a connection to a communication network;
    a transceiver for facilitating communication with external devices; and
    a data processor for sending ones of said transmitted copies of said packets over said communication network.

5. The electronic device of claim 1 wherein said memory controller saves a reduced representation of said digital data.

6. The electronic device of claim 1 wherein said transceiver is a wireless personal area network (WPAN) transmitter.

7. The electronic device of claim 1 wherein said transceiver sends multiple copies of each transmitted packet.

8. The electronic device of claim 1 wherein said memory controller receives a signal acknowledging receipt of said transmitted copy before singly deleting said packet.

9. The electronic device of claim 1 further comprising:
    a switch for deactivating said transceiver.

10. The electronic device of claim 9 wherein said switch is selectable by a user.

11. The electronic device of claim 1 further comprising:
    a file manager providing a user options for selecting ones of said digital data for transmission from said device.

12. A method for managing memory resources on an electronic device comprising the steps of:
    packetizing data stored on said electronic device;
    opportunistically establishing a communication link with at least one neighboring electronic device;
    transmitting a copy of a single packet to said at least one neighboring electronic device;
    communicating said transmitted copy from said at least one neighboring electronic device to a collection host; and
    transmitting additional copies of said single packet to other of said at least one neighboring electronic device as a backup.

13. The method of claim 12 further comprising the step of:
    deleting said data corresponding to said single packet after said associated copy is transmitted.

14. The method of claim 12 further comprising the step of:
    selectably deleting said data corresponding to said single packet after said associated copy is transmitted.

15. The method of claim 12 wherein said establishing step comprises the steps of:
    broadcasting a hail within a transmission radius centered about said electronic device;
    receiving reply transmissions from at least one neighboring electronic device within said transmission radius; and
    creating a data channel between said electronic device and said at least one neighboring electronic device.

16. The method of claim 12 further comprising the steps of:
    issuing an acknowledgment from said collection host addressed to said electronic device;
    receiving said acknowledgment; and
    performing said deleting step after said receiving step.

17. The method of claim 12 further comprising the step of:
    reassembling said received packets at said collection host into a copy of said data stored on said electronic device.

18. The method of claim 12 further comprising the steps of:
    partially reassembling said packets at said electronic device into a thumbnail version of said data stored on said electronic device prior to said deleting step; and
    storing said thumbnail version on said electronic device.

19. The method of claim 12 further comprising the step of:
    checking said transmitted copy for errors.

20. A system of managing memory resources on an electronic device comprising:
    means for packetizing original data stored on said memory resources;
    means for hailing surrounding transport devices;
    means for opportunistically establishing communication channels with only ones of said surrounding transport devices responding to said hail;
    means for singly transmitting copies of said packets to different ones of said surrounding transport devices;
    means for selectively deleting portions of said original data corresponding to said transmitted copies of said packets;
    means for forwarding said singly transmitted copies from said different ones of said surrounding transport devices to a collection point; and
    means at said collection point for reassembling said forwarded copies into a copy of said original data.

21. The system of claim 20 further comprising:
means for saving reduced copies of said original data from ones of said packets corresponding to said transmitted copies.

22. The system of claim 20 further comprising:
means for checking errors in said forwarded copies.

23. The system of claim 1 wherein the communications controller opportunistically establishes communication by:
issuing a general hail to a plurality of different remote transport devices to find remote transport devices within a communications range of said electronic device; and
connecting with at least one remote transport device while in the communications range.

24. The system of claim 23 wherein the communications controller opportunistically establishes communication by connecting with the remote transport device if a user of said electronic device passes within the communications range.

25. The system of claim 24 wherein the communications controller opportunistically establishes communication by connecting with another remote transport device before the user of said electronic device leaves the communications range.

26. The system of claim 12 wherein opportunistically establishing communication includes:
searching for neighboring electronic devices within a communications range of said electronic device; and
connecting with at least one of the neighboring electronic devices while in the communications range.

27. The system of claim 26 wherein opportunistically establishing a communication link includes connecting with another neighboring electronic device if said electronic device Is moved out of the communications range.

* * * * *

UNITED STATES PATENT AND TRADEMARK OFFICE
CERTIFICATE OF CORRECTION

PATENT NO. : 7,133,893 B2  Page 1 of 1
APPLICATION NO. : 09/921467
DATED : November 7, 2006
INVENTOR(S) : Timothy L. Goldstein It is certified that error appears in the above-identified patent and that said Letters Patent is hereby corrected as shown below:

In column 9, line 37, in Claim 1, delete "date" and insert -- data --, therefor.

In column 9, line 45, in Claim 3, delete "pockets" and insert -- packets --, therefor.

In column 12, line 16, in Claim 27, after "device" delete "Is" and insert -- is --, therefor.

Signed and Sealed this

Fifth Day of May, 2009

JOHN DOLL
*Acting Director of the United States Patent and Trademark Office*